(No Model.)
E. THOMSON.
ELECTRICAL WELDING MACHINE.
No. 398,913. Patented Mar. 5, 1889.
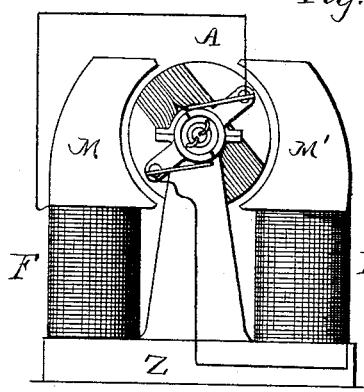
Fig. 1.
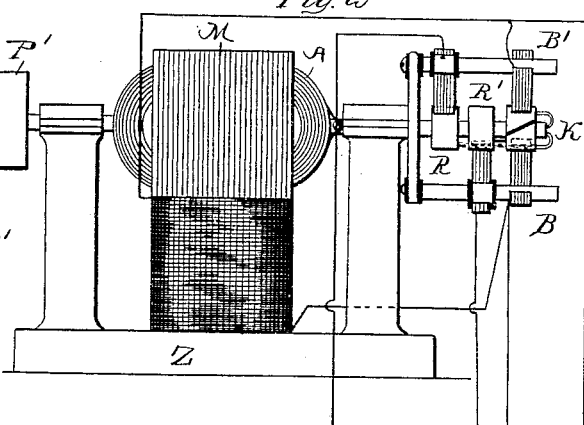
Fig. 2.
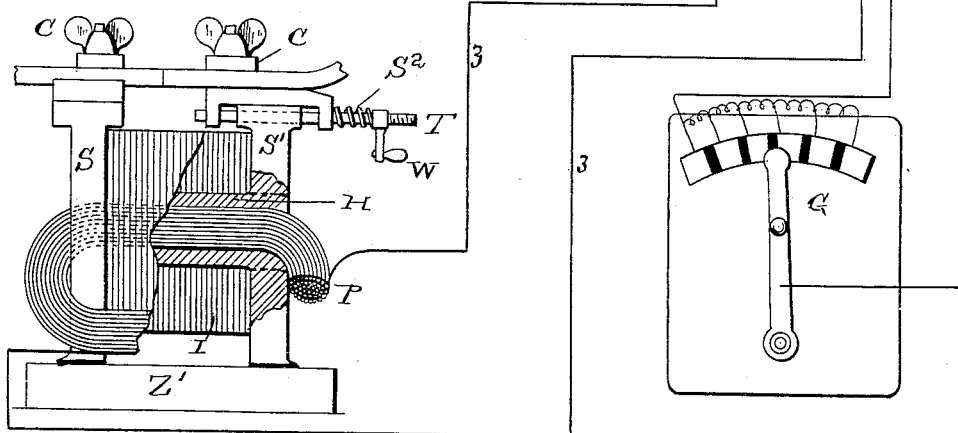
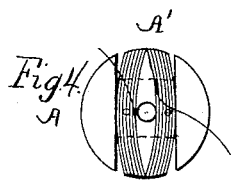
Fig. 4.
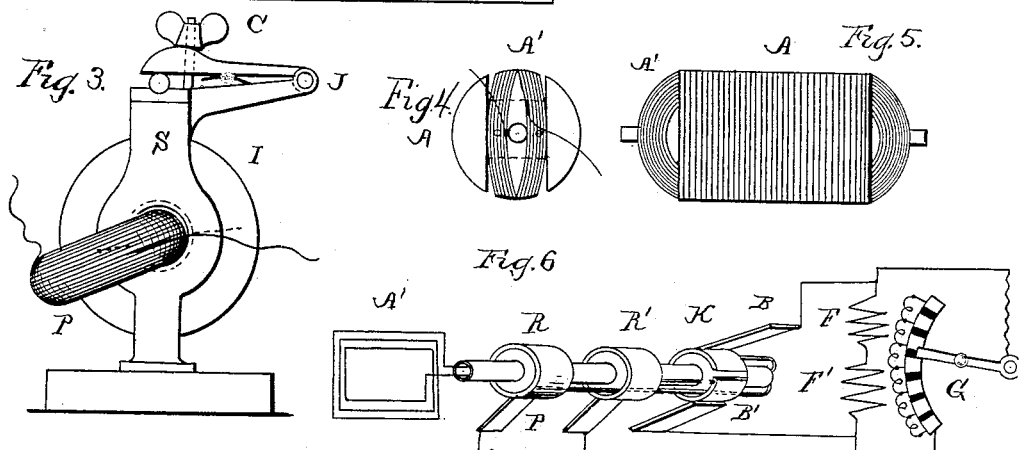
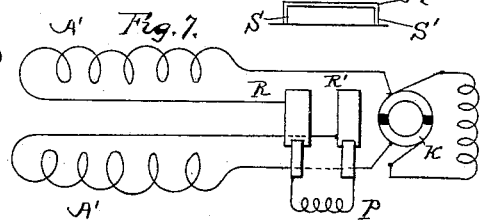
Fig. 7.
WITNESSES:
Wm H Capel
M D Porter
INVENTOR,
Elihu Thomson
BY
Townsend
& MacArthur
ATTORNEYS.

UNITED STATES PATENT OFFICE

ELIHU THOMSON, OF LYNN, MASSACHUSETTS.

ELECTRICAL WELDING-MACHINE.

SPECIFICATION forming part of Letters Patent No. 398,913, dated March 5, 1889.

Application filed June 2, 1888. Serial No. 275,795. (No model.)

*To all whom it may concern:*

Be it known that I, ELIHU THOMSON, a citizen of the United States, and a resident of Lynn, in the county of Essex and State of Massachusetts, have invented a certain new and useful Electric Metal-Working Apparatus, of which the following is a specification.

The object of my invention is to produce a simple and effective apparatus for generating electric currents of large volume and small electro-motive force suitable for use as the heating electric currents in various metal-working operations—such, for instance, as the operation of welding described in my patents, Nos. 347,140, 347,141, and 347,142.

A further object of my invention is to provide for the proper regulation of the heating-current.

My invention consists, essentially, of a power-driven dynamo, of any suitable construction, supplying alternating electric currents directly to an induction-coil, the primary of which is of larger resistance than the secondary, while the secondary connects with the work by means of the holders or clamps or other devices.

My invention also provides a means whereby the dynamo-machine may be a self-exciting machine, and yet may supply the alternating currents directly to the primary of the induction-coil.

My invention also provides an alternating-current dynamo, which may supply alternating currents to the working-circuit, and which may be excited by the working-current or a portion of the working-current, as will be hereinafter described.

My invention consists in the combinations of devices and apparatus which will be hereinafter described, and then more specifically stated in the claims.

Referring to the accompanying drawings, Figure 1 is an end elevation of a dynamo-machine. Fig. 2 is a diagram showing the dynamo in side elevation and the converter in side elevation and partial section, together with the proper electrical connections. Fig. 3 is an end elevation of the converter. Fig. 4 is an end elevation of the dynamo-armature. Fig. 5 is a side elevation of the armature. Fig. 6 is a diagram of the circuits of the dynamo-machine. Fig. 7 is a diagram of a modified arrangement.

Referring to the drawings, Z indicates the base of the dynamo; F F', the field-magnet coils; M M', the field-magnet poles, and A the armature of the dynamo, which is revolved by suitable power applied to a pulley, P', between the field-magnet poles.

The armature A is wound with an armature coil or coils, A', applied thereto in any suitable manner. The form of armature shown is the well-known H form used in the dynamo-machines originally known as the "Siemens machine," which was first employed for electroplating operations. The coils A' are, however, in the present instance given a sufficient number of turns to supply a current of considerable electro-motive force.

P indicates the primary coil of an induction coil or converter, which will be presently described and which is included in a working-circuit, 3, to which alternating currents are directly supplied from the armature-coil A'. For this purpose one terminal of the armature-coil A' is carried through the hollow armature-shaft, and is connected with a continuous ring, R, supported on the armature-shaft, but insulated therefrom and provided with a suitable collecting-brush connected with one of the working-circuit conductors 3. The other terminal of the armature-conductor is connected with one of the segments of a two-part commutator, K. A two-part commutator is here shown because a single armature-coil is employed. It will, however, be understood that a number of separate coils might be employed with a corresponding increase in the commutator-segments, the construction of the commutator being such as to change the connections with the brushes B B' correspondingly with the changes in the direction of current in the armature-coils.

One terminal of the field-magnet coils F F' is connected with a brush, B', bearing on the commutator K, while the other terminal thereof connects with the opposite brush B of said commutator. The remaining segment of the commutator is electrically connected with a continuous conducting-ring, R', similar to R, but which is insulated from the shaft and from said ring. On the ring R' bears a collecting-brush connected to the opposite pole of the working-circuit 3. It will be observed that by this arrangement alternating currents are delivered directly to the working-circuit 3 and the primary P of the induction-coil, but that by means of the commutator such working-currents are locally commuted in the portion of continuous circuit including the field-magnet coils, so that the currents delivered by the armature circulate on a portion of their circuit as alternating currents and on another or local portion as continuous currents suitable for sustaining the field of the dynamo.

In a branch around the commutator, as indicated, is a suitable variable resistance, G, the function of which is not only to vary the output of the dynamo on the circuit 3, but also to prevent injurious sparking at the rectifying-commutator, as will be hereinafter described.

The connections whereby the above results are produced are more clearly indicated in Fig. 6. It is obvious that the same effects might be produced by introducing the working-circuit 3 and the coil P at any other portion of the circuit of coil A' where the currents delivered from said coil flow as alternating currents. Thus, for instance, the coil A' might be divided at any portion of its length and the free ends brought to the collecting-rings R R', as indicated in Fig. 7, the outer ends of the coil being connected with the segments of the commutator, as clearly shown in said figure. The result would, obviously, be the same as before—viz., that the coil P and circuit 3 would have alternating currents, while the portion of the circuit for coil A' which includes the commutator and the field-magnet coils would carry a continuous or unidirectional current.

In the improved form of induction apparatus which I have illustrated the low-resistance secondary consists of a tube or cylinder, H, of copper or other suitable conducting material, through which the one or more primary coils P are strung, as clearly shown. Radial extensions S S' from said cylinder or tube, and of large mass, serve as the means for conveying the developed secondary currents to the work, and with a proper application of the primary coil may also operate as a part of the secondary circuit inductively related to the primary. In the present case the radial extensions S S' support directly the holders or clamps C C', in which the article of metal to be heated is placed. The tube H also has extensions forming feet or legs which support the apparatus upon a base, Z', the latter being preferably of insulating material. Applied to the tube H are a number of washers or plates, I, of iron, which serve to form a magnetic circuit around the inclosed primary coil and secondary tube. These washers act, after the manner of the iron mass in any converter or induction-coil, to heighten the inductive action. The tube H may be made in two parts united in any desired manner at the center on the line indicated by the dotted line, the transverse extensions, one or both, being integral with said tube, or being united thereto on the dotted line indicated, or being connected therewith in any other desired way. A joint either in the tube itself or at the point of union of said tube with the end extension or piece is obviously necessary in order to permit the ready application of the rings or washers I. The clamp C is fixed directly to the extension S, while the clamp C' is capable of movement on the extension S'. For this purpose it is provided with feet or lugs strung upon a rod or bar, T, which extends from opposite sides of the extension S', and by means of which the body of the clamp C' is held down in firm contact with the conducting-extension S'. The clamp C is actuated for welding or other operations by means of a screw-nut operated by a handle, W, and engaging with the threaded end of the bar T. A spring, S², interposed between the nut and the foot of the clamp or holder C', acts to permit the application of an elastic pressure to the work. This device is not, however, essential. The clamps may be constructed as shown in Fig. 3, the upper portion of the clamp being pivoted or hinged, as indicated at J, and forced down upon the work by means of a screw or nut. In the operation of the apparatus the brushes B B' are preferably set to take up the maximum potential of current from the commutator.

In operating the apparatus for welding or metal-working operations it is preferable to first set the resistance G so that most of the current will be shunted from the field-magnet coils. The resistance G is then operated to gradually increase the resistance in shunt to the brushes, thereby raising the power of the field-magnets and producing a gradual increase of the current on the working-circuit 3, and also of the converted current delivered by the secondary connections S S'. The resistance G can be manipulated obviously in any way to control the current in the primary and secondary circuits for the purpose of increasing, decreasing, or keeping said current stationary. If the commutator K is properly set, the operations will be attended with very little sparking. This method of varying the current on the working-circuit 3 by variably shunting the brushes of the commutator by which the alternating main current is locally commuted will be found useful under very many conditions.

The resistance in the shunt around the commutator operates admirably even when it is not made variable to check the spark which would otherwise appear at the commutator under variable electrical conditions in the action of the machine or in the circuits supplied thereby.

To perform the best work as a spark-preventer, the resistance should be without much self-induction and not of any great amount.

The construction of converter or transformer hereinbefore described forms no part of my present invention, but will be made the subject of another patent.

What I claim as my invention is—

1. In an apparatus for the electric working of metals, the combination of a transformer, a dynamo-machine having an armature-coil supplying the primary of said transformer, uncommuted currents, a field-coil connected with a commutator, by which the primary alternating currents are locally rectified in said coil, and a means for varying the current flowing to said coil, as and for the purpose described.

2. An apparatus for developing currents of large volume, comprising in combination a dynamo-machine, the armature of which develops alternating currents, a converter having a low-resistance secondary and a primary included in an alternating portion of the armature-circuit, a field-sustaining coil for the dynamo placed in series with the armature and primary of the transformer, and a commutator between the field and the alternating portion of the circuit for locally straightening the alternating currents which pass through the armature and primary of the converter and develop the large-volume currents in the secondary of the latter.

3. The combination, with a dynamo-machine delivering alternating currents direct to a working-circuit, of a commutator for locally commuting the working-currents, a field-magnet sustained by such locally-commuted currents, and a variable resistance around said commutator.

4. In an alternating-current dynamo, continuous-current field-coils traversed by the main or working current commuted, in combination with a variable resistance around the commuting device, as and for the purpose described.

Signed at Lynn, in the county of Essex and State of Massachusetts, this 28th day of May, A. D. 1888.

ELIHU THOMSON.

Witnesses:
M. L. THOMSON,
WM. D. POOL.